(12) United States Patent
Lester et al.

(10) Patent No.: US 10,722,860 B2
(45) Date of Patent: Jul. 28, 2020

(54) MIXING REACTOR AND RELATED PROCESS

(71) Applicant: The University of Nottingham, Nottingham (GB)

(72) Inventors: Edward Lester, Nottingham (GB); Thomas Huddle, Nottingham (GB)

(73) Assignee: The University of Nottingham, Nottingham (GB)

( * ) Notice: Subject to any disclaimer, the term of this patent is extended or adjusted under 35 U.S.C. 154(b) by 0 days.

(21) Appl. No.: 16/426,760

(22) Filed: May 30, 2019

(65) Prior Publication Data

US 2019/0275493 A1    Sep. 12, 2019

Related U.S. Application Data

(63) Continuation of application No. 14/761,191, filed as application No. PCT/GB2014/050103 on Jan. 15, 2014, now abandoned.

(30) Foreign Application Priority Data

Jan. 15, 2013  (GB) .................................. 1300709.1
Feb. 6, 2013   (GB) .................................. 1302109.2

(51) Int. Cl.
*B01J 3/00*      (2006.01)
*B01J 19/24*     (2006.01)
(Continued)

(52) U.S. Cl.
CPC ........... *B01J 19/2405* (2013.01); *B01F 5/045* (2013.01); *B01F 5/0451* (2013.01);
(Continued)

(58) Field of Classification Search
None
See application file for complete search history.

(56) References Cited

U.S. PATENT DOCUMENTS 4,519,423 A    5/1985  Ho et al.
5,304,327 A    4/1994  Welker et al.
(Continued)

FOREIGN PATENT DOCUMENTS

DE    102005053862 A1    10/2007
EP        0167060 A1     8/1986
(Continued)

OTHER PUBLICATIONS

Machine Translation for FR 2530967 A. Retrieved from Espacenet on Sep. 11, 2019. (Year: 2019).*

(Continued)

*Primary Examiner* — Jennifer A Leung
(74) *Attorney, Agent, or Firm* — Quarles & Brady LLP

(57) ABSTRACT

A mixing reactor for precipitating nanoparticles by mixing a precursor fluid with a second fluid at a higher temperature than the precursor fluid. The reactor comprises: a first fluid conduit with an inlet region configured to receive a flow of the precursor fluid, and an outlet region configured to output a mixed flow; and a second fluid conduit configured to receive a flow of the second fluid. The second fluid conduit extends into the first fluid conduit in a direction substantially perpendicular to the flow within the first fluid conduit, and has an opening for introducing the second fluid into the first fluid conduit. Related processes for producing nanoparticles are disclosed.

16 Claims, 6 Drawing Sheets

(51) Int. Cl.

| | | |
|---|---|---|
| *B01J 19/26* | (2006.01) | |
| *B01J 19/00* | (2006.01) | |
| *B01F 5/04* | (2006.01) | |
| *B01F 5/06* | (2006.01) | |
| *B01J 4/00* | (2006.01) | |
| *B01F 15/06* | (2006.01) | |
| *B01J 3/04* | (2006.01) | |
| *C01G 49/06* | (2006.01) | |
| *B01F 3/00* | (2006.01) | |

(52) U.S. Cl.
CPC .......... *B01F 5/0463* (2013.01); *B01F 5/0614* (2013.01); *B01F 15/065* (2013.01); *B01J 3/008* (2013.01); *B01J 3/042* (2013.01); *B01J 4/002* (2013.01); *B01J 19/006* (2013.01); *B01J 19/2415* (2013.01); *B01J 19/26* (2013.01); *C01G 49/06* (2013.01); *B01F 2003/0064* (2013.01); *B01J 2219/00103* (2013.01); *B01J 2219/24* (2013.01)

(56) References Cited

U.S. PATENT DOCUMENTS

| | | | |
|---|---|---|---|
| 6,361,025 | B1 | 3/2002 | Cincotta et al. |
| 6,440,337 | B1 * | 8/2002 | Hanna .................. A61K 9/1688 264/11 |
| 7,383,850 | B2 | 6/2008 | Buzanowski et al. |
| 2006/0097228 | A1 | 5/2006 | Lee et al. |
| 2007/0020171 | A1 | 1/2007 | Waki et al. |
| 2007/0206435 | A1 | 9/2007 | Lester et al. |
| 2010/0129917 | A1 | 5/2010 | Panizza et al. |
| 2010/0266846 | A1 | 10/2010 | Kim et al. |
| 2011/0091560 | A1 | 4/2011 | Smith et al. |
| 2012/0014209 | A1 | 1/2012 | Smith |
| 2012/0226073 | A1 | 9/2012 | Heinen et al. |

FOREIGN PATENT DOCUMENTS

| | | |
|---|---|---|
| EP | 1713569 A2 | 10/2006 |
| EP | 2441512 A1 | 4/2012 |
| FR | 2530967 A1 | 2/1984 |
| GB | 2006033 A | 5/1979 |
| JP | H0258649 A | 2/1990 |
| JP | H0523565 A | 2/1993 |
| JP | 2002292274 A | 10/2002 |
| JP | 2005177746 A | 7/2005 |
| JP | 2007526113 A | 9/2007 |
| JP | 2008012453 A | 1/2008 |
| JP | 2010069474 A | 4/2010 |
| JP | 2012533423 A | 12/2012 |
| JP | 2013000677 A | 1/2013 |
| WO | 2011148121 A1 | 12/2011 |
| WO | 2011148131 A2 | 12/2011 |

OTHER PUBLICATIONS

Blood et al. Chemical Engineering Science 59 (2004) 2853-2861. (Year: 2004).*

Sierra-Pallares et al. Chemical Engineering Science 66 (2011) 1576-1589. (Year: 2011).*

* cited by examiner

MIXING REACTOR AND RELATED PROCESS

CROSS-REFERENCE TO RELATED APPLICATIONS

This application claims priority to U.S. patent application Ser. No. 14/761,191 filed Jul. 15, 2015, which is a 371 application of PCT/GB2014/050103, filed Jan. 15, 2014, which claims priority to GB1300709.1 filed Jan. 15, 2013, and GB1302109.2 filed Feb. 6, 2013, the entire contents of which are incorporated herein by reference.

The present invention relates to a mixing reactor that enables the efficient mixing of streams of fluid. More specifically, one stream may be of a heated, pressurised or supercritical fluid whilst another is a denser fluid. More preferably, one stream may be supercritical water ($scH_2O$), and another is of a metal containing solution, such as an aqueous metal salt solution. Most preferably, the invention can be used in the continuous synthesis of nanoparticles of metals or metal oxides in high temperature water without blockage of pipeworks and with a high degree of control of particle size and shape. An especially suitable use of the reactor and process is to produce nanoparticles.

Metal and metal oxide particles with nanometer scale dimensions have a wide range of uses, including (but not limited to) catalysts, pigments, polishes, ultraviolet absorbers and in ceramics and batteries. It is well known that such particles can be formed by a chemical reaction of aqueous solutions of metal salts with heated, pressurised or supercritical water. In principle, this methodology offers distinct advantages over other methods of nanoparticle creation in terms of cost and viability as it allows the reaction to be performed as a continuous process.

One mixing reactor suitable for the creation of nanoparticles is described in EP1713569 (for example, particles with a mean, median or modal diameter of less than 100 nm, 50 nm or less than 10 nm, 5 nm or 1 nm). This reactor is a counter-current design, in which superheated fluid is introduced in a downward direction into a precursor fluid, such as an aqueous metal salt solution, which is flowing upwards. This approach ensures good mixing, and has been shown to produce consistent, uniform nanoparticles, without blocking.

An alternative approach is disclosed in WO2011/148131, in which a co-current mixer is described in which the precursor fluid is introduced from two opposite horizontal conduits into an upward fluid conduit. Superheated fluid is introduced into the upward fluid conduit in an upward direction, resulting in downstream co-current mixing. The superheated fluid is introduced via a fluid conduit which extends upwards through the fluid conduit containing the precursor fluid.

It is an object of the present invention to provide an improved mixing reactor and related process for producing nanoparticles, or at least to provide a useful alternative to the prior art reactors and processes.

According to a first aspect of the invention, there is provided a mixing reactor for precipitating nanoparticles by mixing a precursor fluid with a second fluid at a higher temperature than the precursor fluid, wherein the reactor comprises: a first fluid conduit with an inlet region configured to receive a flow of the precursor fluid, and an outlet region configured to output a mixed flow; and a second fluid conduit configured to receive a flow of the second fluid, the second fluid conduit extending into the first fluid conduit in a direction substantially perpendicular to the flow within the first fluid conduit, and having an opening for introducing the second fluid into the first fluid conduit.

The present applicant has identified that it is, in some circumstances, important to avoid significant pre-heating of the precursor fluid before it is mixed with the second fluid. Such pre-heating can result in precipitation of particles, adversely affects the quality of particles which are produced and can result in problems with pumping. In the arrangement of WO2011/148131, the second fluid is introduced via a fluid conduit that extends through the precursor fluid parallel to the direction of precursor fluid flow. This results in heat exchange between the precursor and second fluid, heating the precursor, and cooling the second fluid.

The present invention overcomes this limitation by introducing the second fluid through a second fluid conduit that is perpendicular to the flow direction of the precursor fluid. There is therefore no, or limited, opportunity for the second fluid to exchange heat with the precursor fluid prior to the mixing location. Extending the second fluid conduit into the first fluid conduit results in the second fluid being introduced away from the sidewall of the first fluid conduit so as to ensure good mixing.

The inlet region may be substantially co-axial with the outlet region.

The mixing reactor may be configured such that flow in both the inlet region and outlet region is in an upward, substantially vertical direction.

The inlet region may have a single inlet port for receiving the precursor fluid.

The arrangement of WO2011/148131 uses two inlet ports into the inlet region. This may result in problems. Such problems may be associated with an oscillating fluid mixing zone, and/or asymmetric mixing, resulting in a tendency for different mixing environments at difference places across the fluid flow if the flow is not equal through both inlet ports. The present applicant has found that arrangements with multiple inlet ports for the precursor fluid tend to result in some form of uneven flow or oscillation in flow from one side to the other, which adversely affects product quality.

The opening in the second fluid conduit may face with the direction of flow through the first conduit.

The opening may face substantially perpendicular to the direction of flow through the first conduit.

The first conduit may have a substantially uniform cross section, either below the point where the second fluid conduit joins, or above that point, or from a region below that point through to a region above that point.

The first conduit may comprise a former adapted to fill a recess in the first conduit, the former thereby at least partially defining a uniform cross section of the first conduit from below the point of the opening above it.

The second fluid conduit may extend across the full width of the first fluid conduit.

The second fluid conduit may extend through the first fluid conduit, and be configured to flow the second fluid towards the opening from both sides of the second fluid conduit.

This arrangement may be particularly suitable where the second fluid is a superheated fluid, since the low surface tension and viscosity of such a fluid will mitigate any problems with balancing flow and flow oscillation. Whilst balancing normal liquids/fluids, such is attempted in the arrangement of WO2011/148131 is awkward and be difficult to achieve due to the fluid dynamics and characteristics of positive displacement pumps, it is easier for supercritical fluids.

The opening may introduce the second fluid directly into a central flow region of the first fluid conduit, which may be a cylindrical pipe.

The opening may be defined through a sidewall of the second fluid conduit.

The second fluid conduit may comprise a plurality of openings.

The openings may be spaced axially along the second fluid conduit.

The openings may be spaced circumferentially around the second fluid conduit, for example laterally sideways (radially) of the second conduit, or symmetrically disposed matching opening on the upper side of the second conduit.

The reactor may comprise a T-piece with a two opposite ports, and a third side-port, wherein the first fluid conduit comprises a region between the opposite ports, and the second fluid conduit is introduced via the side-port.

The reactor may comprise a cross piece with a first pair of opposite ports and a second pair of opposite ports, the first pair being at 90 degrees to the second pair, wherein the first fluid conduit comprises a region between the first pair of ports, and the second fluid conduit is introduced through the second pair of ports.

The profile of the second conduit may be adapted to improve mixing downstream of the second conduit.

A profile of the second conduit may be adapted by a former, or fluid-flow controller, attached thereto.

The former may taper away from the second fluid conduit so that is narrower in an upstream direction.

The former may extend the profile of the second conduit in a direction perpendicular to flow through the first conduit. The former may have a curved cross-sectional profile.

A heater or a cooler may be provided at or around the outlet region to control the temperature of the mixed fluid.

A heater may be provided around the second conduit to provide heat to the second fluid.

The inlet region may comprise a heater or cooler to control the temperature of the precursor fluid.

The mixing reactor may further comprise an inlet port in the outlet region for receiving a third fluid.

The inlet port may be configured to receive a quenching fluid.

The second fluid may comprise superheated water.

The precursor fluid may comprise a metal salt.

According to a second aspect of the invention, there is provided a method for preparing nanoparticles by flowing a precursor fluid into a mixing reactor through a first fluid conduit, introducing a second fluid to the first fluid to the first fluid conduit via a second fluid conduit which extends into the first fluid conduit in a direction substantially perpendicular to the direction of flow in the first fluid conduit.

The mixing reactor may be a mixing reactor according to the first aspect of the invention.

The nanoparticles may comprise metal and/or metal oxide.

The invention will now be described, by way of example, with reference to the following drawings, in which.

Figure 5:
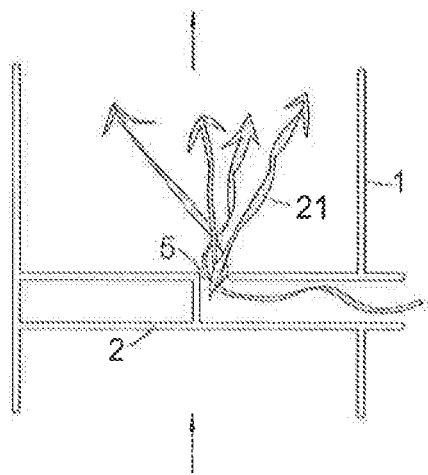
FIG. 5 is a schematic sectional diagram showing flow from the opening of a second fluid conduit that extends fully across the first fluid conduit, the opening being central to the section of the first fluid conduit.
Figure 6:
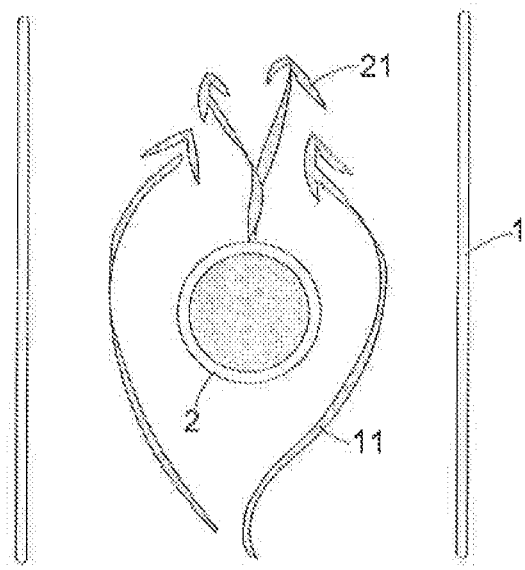
Figure 7:
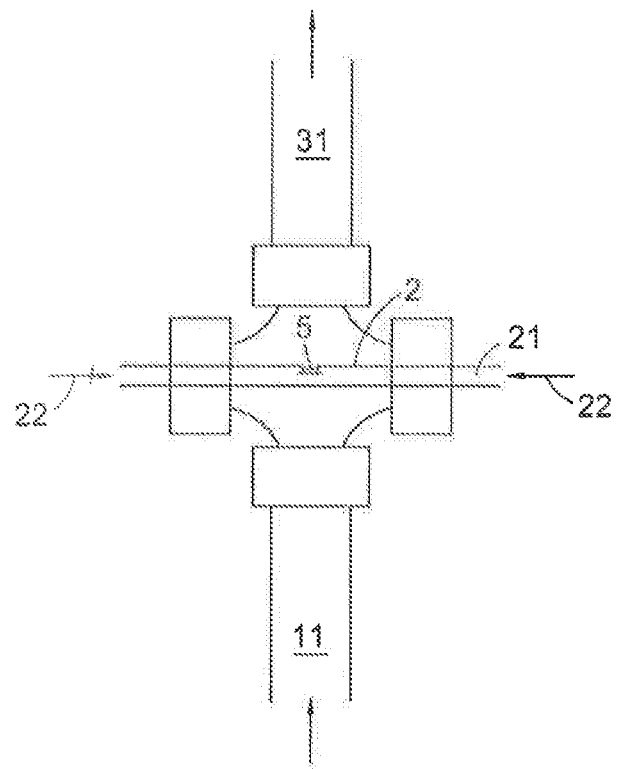
Figure 8:
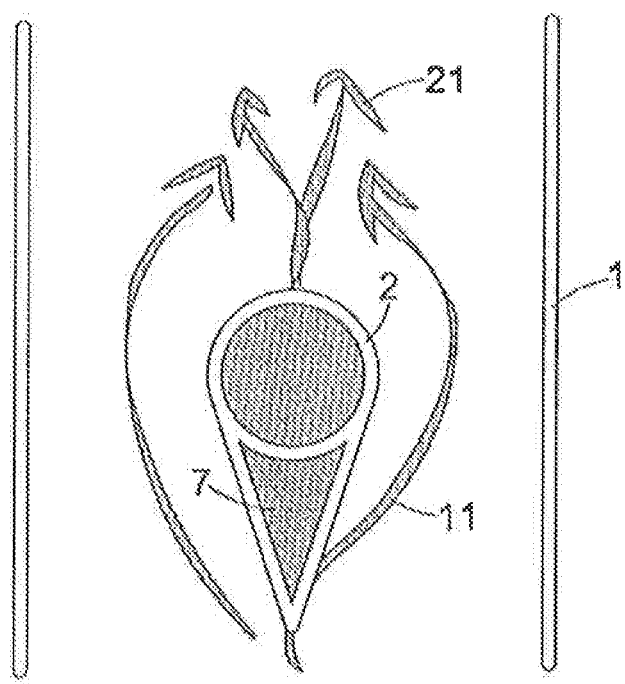
Figure 9:
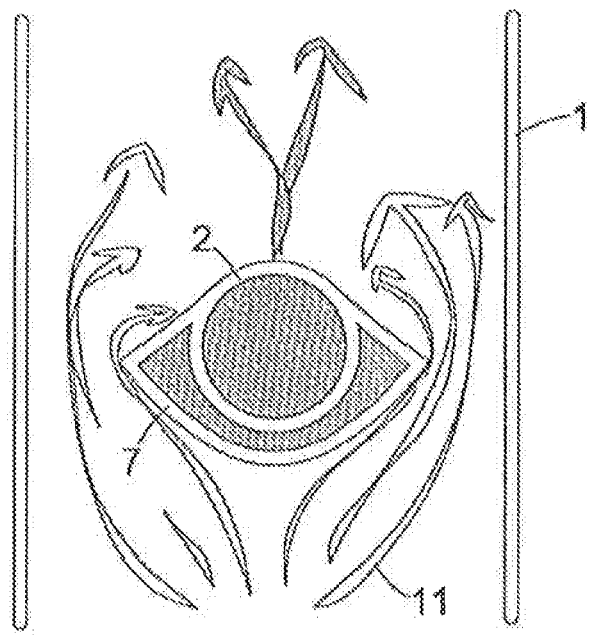
Figure 10:
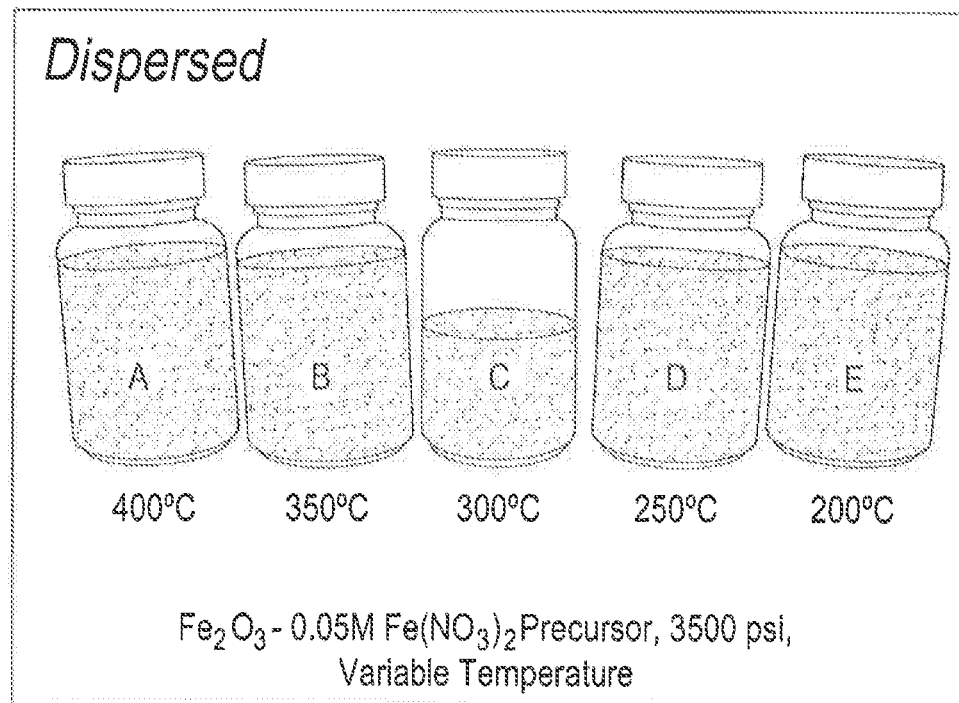
Figure 11:
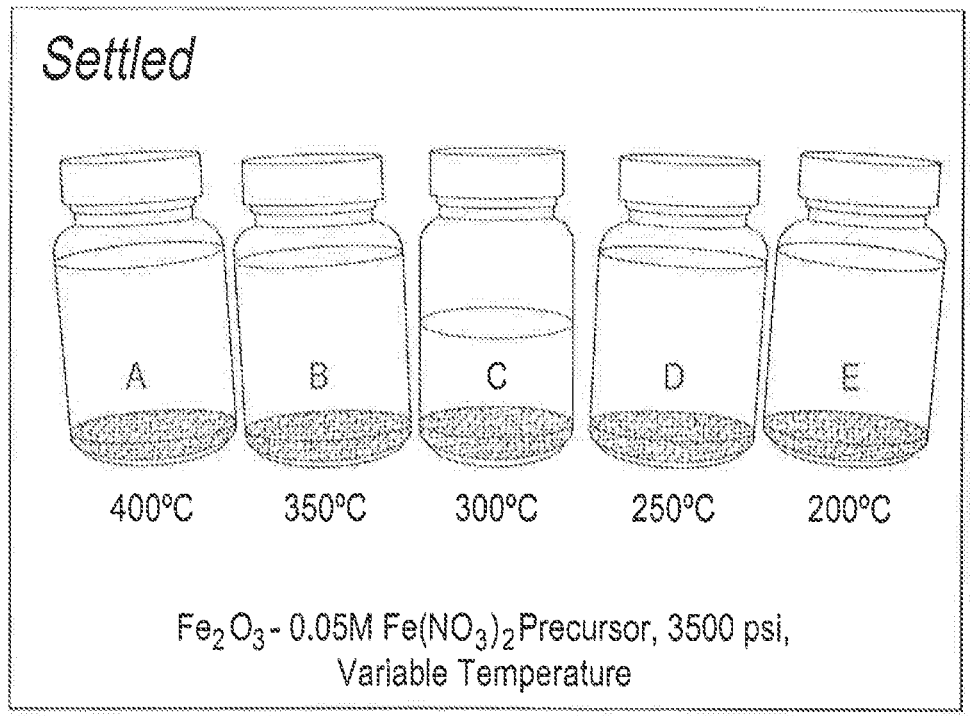
Figure 12:
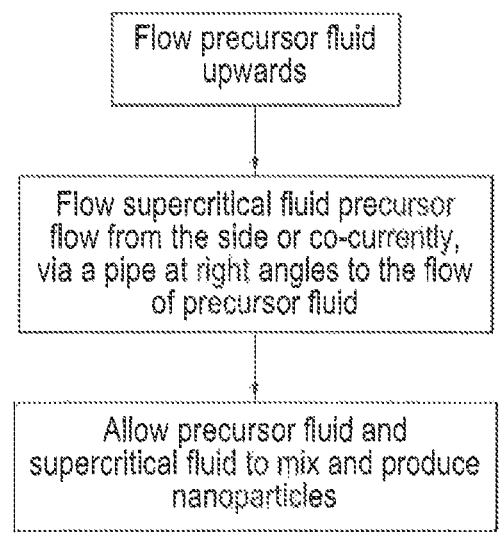

FIG. 6 schematically indicates flow around the fluid conduit of FIG. 5;

FIG. 7 is a schematic sectional drawing of a further embodiment of the invention, in which the second fluid conduit extends through the first fluid conduit and is configured to flow the second fluid towards the opening from two opposite directions;

FIG. 8 is a schematic of flow around a second fluid conduit which has a former attached thereto, so as to modify the profile of the second fluid conduit to improve downstream mixing;

FIG. 9 is a schematic of flow around a second fluid conduit which has an alternative former attached thereto;

FIG. 10 is a photograph showing dispersed suspensions of nanoparticles obtained by a process according to an embodiment of the invention;

FIG. 11 is a photograph showing the suspensions of FIG. 11 after settling; and FIG. 12 is a flow diagram of a process according to an embodiment of the invention.

Figure 1:
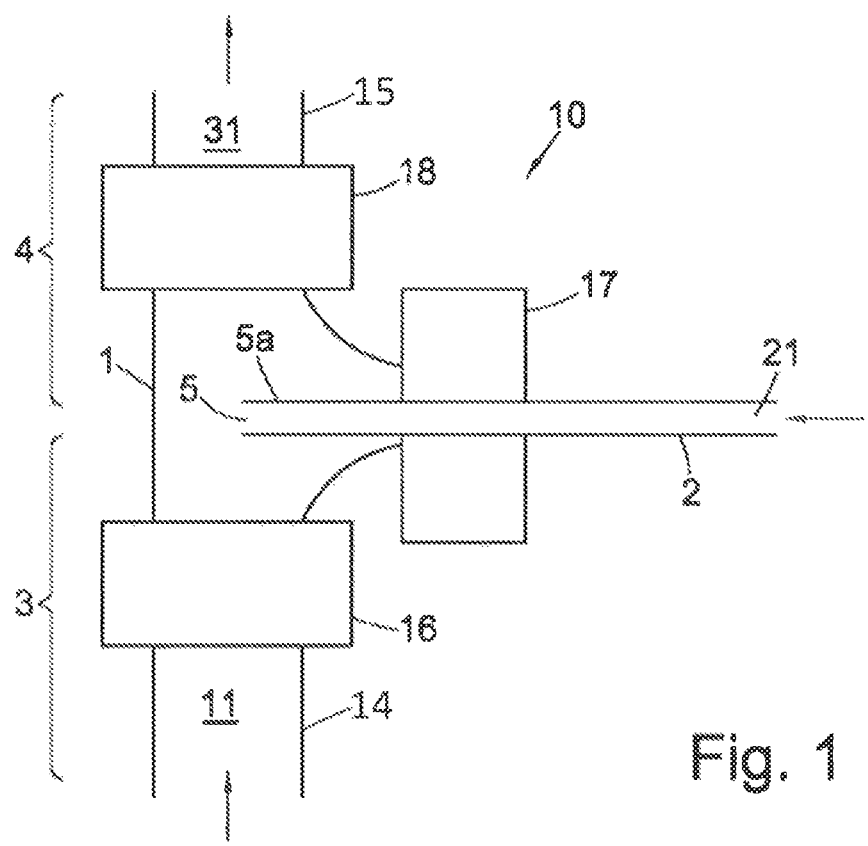
FIG. 1 is a schematic sectional diagram of a mixing reactor according to an embodiment of the invention.

Referring to FIG. 1, a mixing reactor 1 is shown, comprising a first fluid conduit 1 and a second fluid conduit 2. In many embodiments the conduits 1 and 2 are cylindrical pipes, possibly of steel.

The first fluid conduit 1 comprises an inlet region 3 for receiving a flow of precursor fluid 11, and an outlet region 4 for outputting a mixed flow 31. The first fluid conduit in the present embodiment comprises a T-piece, in which inlet and outlet ports for the precursor 11 and mixed flow 31 respectively are co-axial. A cylindrical pipe 14 is connected to the inlet port of the T-piece using a pressure fitting 16, and carries the precursor fluid 11 thereto. A further cylindrical pipe 15 is connected to the outlet port of the T-piece using a pressure fitting 18, and carries the mixed flow 31 away from the reactor.

The second fluid conduit 2 is configured to carry a second fluid 21 at an elevated temperature, to be mixed with the precursor fluid 11.

The second fluid conduit 2 protrudes into a flow of the precursor fluid 11 within the first fluid conduit 1. The conduit 2 extends outward from the internal sidewall of the first fluid conduit 1. The second fluid conduit 2 enters the first fluid conduit 1 via the third port of the T-piece, and is connected to the T-piece via a pressure fitting 17. The second fluid conduit 2 is conveniently a circular steel pipe, but it will be appreciated this is not essential.

The precursor fluid may for instance be an aqueous metal salt solution. The second fluid 21 may for instance be a supercritical fluid such as water. Alternatively, the second fluid may comprise a fluid in a near critical, or subcritical state. As well as water, other supercritical fluids are contemplated, including, but not limited to dense phase gases and hydrocarbons (e.g. acetone). The elevated temperature of the second fluid may greater than 250° C., or may be around 500° C. The precursor fluid may for example be at ambient temperature. The temperature difference between the precursor and second fluid may be approximately 300-400° C. The pressure of the second fluid is preferably at least 22.5 MPa at mixing. The pressure of the second fluid may be 5, 10, 20, 30, 40 MPa or more, or ranges between the values, or between the values and zero.

The conduit 1 extends generally vertically upright, and the conduit 2 extends perpendicularly to it (generally horizontally).

An opening 5 is provided in an end portion 5a of the second fluid conduit 2, through which the second fluid 21 is introduced into the precursor fluid 11 within the first fluid conduit 1. The second fluid conduit 2 ends at the opening 5, which is defined by the cross-section of the second fluid conduit 2. The opening 5 therefore faces perpendicular to the direction of fluid flow in the first fluid conduit.

The end portion 5a extends radially into the first fluid conduit 1 such that the opening 5 is disposed at the axially extending centreline of the conduit 1.

The inlet region 3 is vertically below the outlet region 4. This arrangement makes use of buoyancy forces to ensure there is no back-mixing of the precursor fluid and second fluid. Such back-mixing, upstream of the point where mixing is intended to take place, tends to result in blockages through uncontrolled particle growth and aggregation. The precursor fluid is typically more dense than the second fluid. This is particularly the case where the second fluid is supercritical water and the precursor is an aqueous solution at a significantly lower temperature. The difference in relative density means the precursor tends to want to sink, with the second fluid wanting to rise. Prior to the mixing point (at the opening 5), the two fluids tend to be effectively partitioned by buoyancy forces: the second fluid will not back mix into the precursor because of its buoyancy relative thereto.

In other embodiments, the inlet region 3 may not be vertically above the outlet region 4, and the inlet region 3 may be vertically below the outlet region 3, or the two regions may be substantially horizontal.

With the second fluid conduit 2 perpendicular to the flow in the first fluid conduit 1, the second fluid 21 does not exchange heat significantly with the precursor fluid 11 before they mix at the point where the second fluid conduit 2 introduces the second fluid 21 to the first fluid conduit 1. This prevents both cooling of the second fluid 21 and heating of the precursor fluid 11 before mixing. The length of the end portion 5a of conduit 2 is relatively short, and the flow velocity of supercritical fluid in the conduit 2 is fast, so the supercritical fluid has only a short dwell time in that portion of the conduit 2 that extends into the flow precursor 11. The temperature of the precursor fluid 11, second fluid 21 and the mixture 31 can therefore be independently adjusted, for instance by heater jackets or heat exchangers on the respective fluid conduits that deliver the fluids to the mixing reactor. This is in contrast to the arrangements disclosed by WO2011/148131, in which the second fluid will tend to heat up the precursor fluid in the region upstream of the mixing point, because the second fluid is introduced to the reactor via a pipe which extends through the precursor fluid in the direction it is flowing. This heating of the precursor may give rise to uncontrolled precipitation of particles in this region, which may adversely affect product quality (i.e. poor control of particle size distribution) and/or result in blockage.

In addition to overcoming the limitations of mixing reactors disclosed in WO2011/148131, it is also thought that this arrangement provides a useful alternative to the counter-current arrangement of EP1713569. It has been found that the operation of the counter-current mixer of EP1713569 can vary depending on the rate of flow therethrough. The present arrangement is likely to scale in a different way than a counter-current mixer, which may enable better optimisation for a wide variety of operational applications. For instance, the present arrangement may scale to large scale production more readily, or may be more readily adaptable to varying flow conditions. The present invention may be advantageous in production where the flow rate of the supercritical fluid and/or precursor fluid is of the order of a cubic metre per hour.

Figure 2:
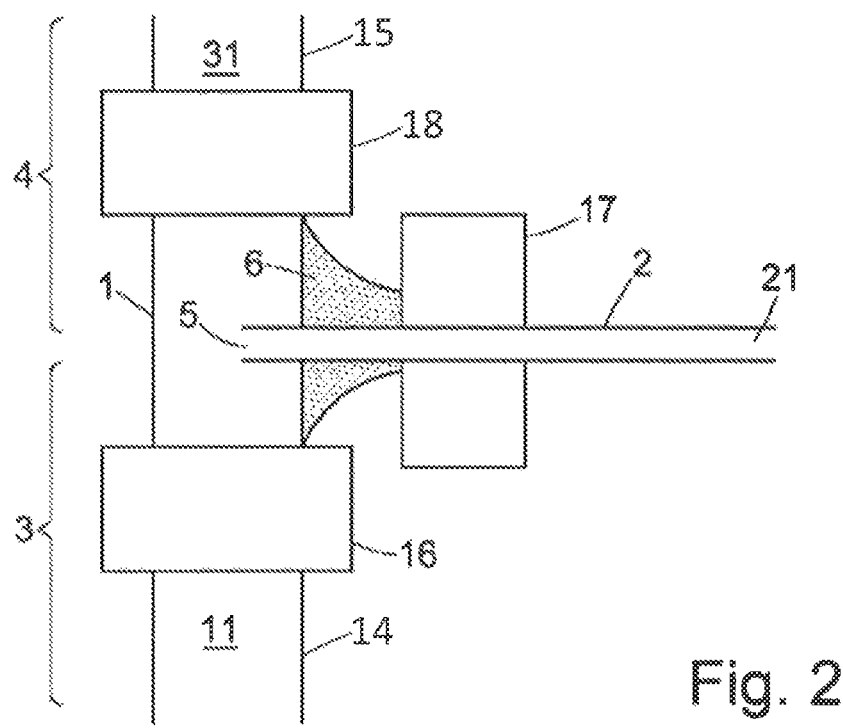
FIG. 2 is a schematic sectional diagram of a mixing reactor according to an embodiment, with a former in the first fluid conduit.

In FIG. 2, a former 6 has been fixed within the first fluid conduit 1, so as to improve the uniformity of the cross sectional area thereof, and to eliminate dead-spots where fluid may re-circulate. The former 6 is arranged to conform to the profile of the second fluid conduit 2 and the first fluid conduit 1, and to fill the region around the port through which the second fluid conduit 2 enters the T-piece. The result is that the first fluid channel 1 has a substantially circular cross section throughout its length, thereby eliminating the potential for accumulation of particles in dead-zones. Stagnant zones are avoided because the precursor fluid 11 sweeps through the full volume of the mixing area. The former 6 may be fixed to the inner wall of the first fluid conduit 1, for instance by soldering or the like. The former 6 may conveniently comprise a heat resistant, inert material such as a ceramic.

Figure 3:
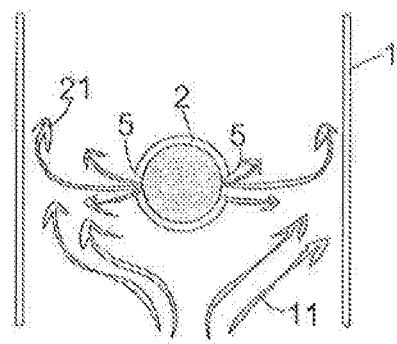
FIG. 3 is a schematic sectional diagram showing flow for an embodiment in which the second fluid conduit has a plurality of openings arranged circumferentially.

FIG. 3 shows an alternative embodiment in which two openings 5 are provided, spaced around the circumference of the second fluid conduit 2 (which has the form of a cylindrical pipe). The openings 5 are defined in the sidewall of the second fluid conduit 2, and each have a smaller cross sectional area than that of the second fluid conduit 2. Such an arrangement is advantageous because it results in more symmetry than an arrangement with a single opening facing perpendicular to the flow direction. Improved symmetry in flow results in more uniform mixing, which helps to promote uniform shaped and sized particles, and reduces the potential for blocking. The more the mixing of the fluids is controlled to be uniform at all point, the closer to a desired mono-sized, single shape particle distribution we expect to achieve.

Figure 4:
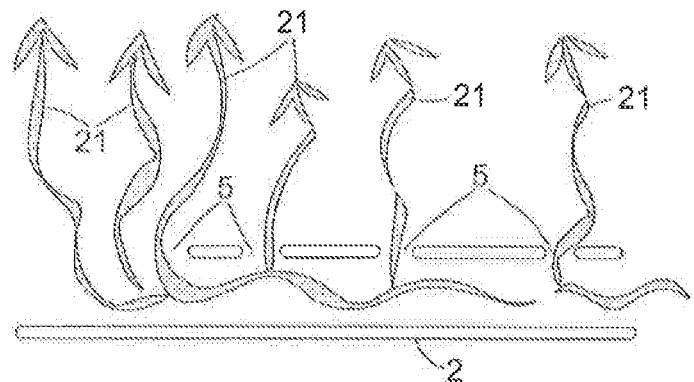
FIG. 4 is a schematic sectional diagram showing flow from a second fluid conduit with a plurality of openings arranged axially.

FIG. 4 shows a further embodiment in which a plurality of openings 5 are provided in the sidewall of the second fluid conduit 2, spaced axially along the second fluid conduit 2. Such an arrangement promotes improved uniformity of mixing of the precursor 11 and second fluid 21, and may be particularly applicable to larger scale reactors. The use of multiple openings 5 enables each individual opening to jet out supercritical fluid at a lower speed than is there was only one aperture of the same size, for the same overall volume flow rate of the supercritical fluid. This can keep the variation in speed of flow of the jetting supercrictical fluid within a closer range over difference set-ups to produce different particles. This may help to ensure greater predictability of fluid flow/particle sizes.

In some embodiments the second fluid may be pumped through the opening with sufficient velocity to form a curtain through which the precursor flow passes as mixing occurs. Such a curtain may be a superheated curtain of fluid.

FIG. 5 shows another embodiment in which the second fluid conduit 2 extends across the full width of the first fluid conduit. The second fluid conduit 2 has an opening 5 defined in its sidewall, facing in the direction of flow through the first fluid conduit 1. Arrangements in which the opening faces the direction of flow, and which are rotationally symmetric about the central axis of the first fluid conduit are advantageous, because they result in improved uniformity in mixing and therefore greater consistency in the morphology of the particles produced therewith. Extending the second fluid conduit 2 across the full width of the first fluid conduit 1 in this way means that any perturbations to the flow of the precursor 11 due to it flowing around the second fluid conduit 2 will be balanced, as shown in FIG. 6. This is in contrast to the arrangement of FIG. 1, in which only one side of the flow through the first fluid channel 1 will be affected by the second fluid conduit 2.

Because fluid flows towards the opening 5 from a single direction, it is possible that the flow of the second fluid 21 from the opening 5 may include a small component lateral to the axis of the first conduit, which may result in some asymmetry in mixing.

FIG. 7 shows an embodiment which overcomes, or at least ameliorates this problem, by passing the second fluid conduit 2 completely through the first fluid channel 1, and flowing the second fluid 21 towards the opening 5 through the second fluid conduit 2 from two opposite directions, as indicated by the arrows 22. Where the second fluid 2 is a supercritical fluid, it is unlikely that there will be problems with balancing the flow or with flow oscillation, due to the very low viscosity of supercritical fluids. Any such imbalances will be short-lived due to these characteristics of supercritical fluids.

The opening 5 is again provided in the sidewall of the second fluid conduit 2, facing in the direction of flow through the first fluid conduit 1. In this embodiment, the flow of the second fluid 21 from the opening 5 will be co-axial with the flow of the precursor fluid 11, resulting in a high uniformity of mixing.

It may be advantageous to modify the pattern of flow adjacent to the interface between the inlet region 3 and outlet region 4 to promote uniformity of mixing. FIGS. 8 and 9 shows embodiments in which a former 7 (or fluid flow controller 7) is fixed to the second fluid conduit 2 to modify the flow in the region of the interface so as to promote mixing. Formers/fluid flow controller could additionally or alternatives be provided at the side walls of the first fluid conduit 1.

FIG. 8 shows an embodiment in which the former substantially eliminates a region of stagnation where the flow of precursor fluid 11 impinges against the sidewall of the second fluid conduit 2. Where the second fluid conduit 2 is a circular pipe, a relatively stagnant region of flow will exist adjacent to a region of the sidewall that faces into the direction of flow. In order to avoid this, a former 7 may be fixed to the second fluid conduit 2 that fills this region, tapering away in the upstream direction, and ending in a narrow edge region. Stagnation of flow adjacent to the second fluid conduit 2 is thereby avoided. The former 7 of this embodiment does not extend the profile of the second fluid conduit 2 in a direction perpendicular to the direction of flow in the first fluid conduit 1: it is a tapering fin.

Such a former 7 may comprise any suitable material, but preferably comprise a heat resistant and chemically inert material such as a ceramic. The former 7 may be secured to the second fluid conduit 2 by any convenient means, for example by soldering, brazing or a mechanical fixing. It will be understood that the former 7 extends for the full length of the conduit 2 that is in the flowing precursor so as to achieve symmetrical flow.

FIG. 9 shows an alternative arrangement in which an alternative design of former 7 is fixed to the second fluid conduit 2. This alternative former 7 is configured to promote mixing upstream of the second fluid conduit by extending the profile of the second fluid conduit 2 in a direction perpendicular to the direction of flow in the first fluid conduit 1.

Using formers 7 such as those shown in FIGS. 8 and 9 the width of the second fluid conduit 2 and the precise external profile thereof may be readily tailored to promote uniform mixing, and consequently provide a highly uniform product.

A process for creating nanoparticles using a reactor according to an embodiment has been demonstrated, and is given herein by way of example. In this process the precursor fluid is an aqueous solution of Iron Nitrate $Fe(NO_3)_2$, at ambient temperature, with a concentration of 0.05 molar. The flow rate of the precursor fluid into the reactor was held at 10 ml/min. Supercritical water was used as the second fluid, which was flowed into the reactor via the second fluid channel at a fixed rate of 20 ml/min, at a fixed pressure of approximately 25 MPa (250 bar or 3500 psi). The temperature of the water was varied from 200° C. to 400° C. in 50° C. increments.

FIGS. 10 and 11 show the product that resulted from the reaction, with samples A to E being the product obtained at temperatures of 400° C. to 200° C. respectively. Although there has not yet been time to analyse the product, the results are promising. When the resulting samples are compared with particles produced by other supercritical reactors with different configurations we a difference in colour between the samples, indicative of a difference in particles size and/or distribution. The particles produced are not the same particles as the prior art makes.

Although embodiments have been disclosed in which supercritical water are used as the second fluid, this is not essential and in some applications sub-critical water or other fluids may be used.

In some embodiments, a mixing device may be disposed in the inlet region of the first fluid conduit. Such a mixing device may be used to promote swirling, or to eliminate radial temperature or velocity gradients in the precursor fluid prior to mixing with the second fluid, so as to increase the uniformity of mixing between the precursor and second fluid. The mixing device may for instance comprise a static mixer, or a static helical insert in the inlet region.

Although the example embodiments are co-current mixing reactors, in some embodiments the opening in the second fluid conduit may face against the direction of precursor fluid flow, so as to mix the two fluids in counter-current.

A mixing reactor and related process has been disclosed which overcomes a number of significant problems with prior art reactors. Embodiments of the present invention offer improved independence of temperature control over the precursor fluid, second fluid and mixed fluid, and eliminate regions in which uncontrolled precipitation of particles may occur. Arrangements that facilitate improved uniformity of mixing between the precursor fluid and second fluid have been disclosed, which have the potential to provide improved control over particle size, resulting in narrow particle size distribution.

Whilst specific embodiments of the invention have been described hereinbefore, it will be appreciated that a number of modifications and alterations may be made thereto without departing from the scope of the invention, as defined by the appended claims.

The invention claimed is:

1. A method for precipitating nanoparticles by mixing a precursor fluid with a second fluid at higher temperature than the precursor fluid, the method comprising: flowing the precursor fluid into a mixing reactor through a first fluid conduit, introducing the second fluid to the first fluid conduit via a second fluid conduit which extends into the first fluid conduit, the second fluid conduit having an opening for introducing the second fluid into the first fluid conduit, wherein the second fluid comprises superheated water, and the second fluid conduit extends into the first fluid conduit in a direction substantially perpendicular to the direction of flow in the first fluid conduit.

2. The method of claim 1, wherein the reactor comprises: the first fluid conduit, the first fluid conduit having an inlet region configured to receive the flow of the precursor fluid, and an outlet region configured to output a mixed flow; and the second fluid conduit, the second fluid conduit having the opening for introducing the second fluid into the first fluid conduit.

3. The method according to claim 2, wherein the inlet region is substantially co-axial with the outlet region.

4. The method according to claim 2, wherein the flow in both the inlet region and outlet region is in an upward, substantially vertical direction.

5. The method according to claim 2, wherein the inlet region is provided with the precursor fluid via a single inlet port.

6. The method according to claim 2, wherein the opening faces: with the direction of flow through the first conduit, against the direction of flow through the first conduit, or substantially perpendicular to the direction of flow through the first conduit.

7. The method according to claim 2, wherein the second fluid is introduced through the opening directly into a central flow region of the first fluid conduit, optionally on a central axis of the first fluid conduit.

8. The method according to claim 2, wherein the second fluid is introduced at a plurality of regions in the cross section of the first fluid conduit, said regions being rotationally symmetric about a central axis of the first conduit.

9. The method according to claim 2, wherein the second fluid conduit comprises a plurality of openings by which the second fluid is introduced to the first fluid conduit.

10. The method according to claim 9, wherein the openings are: spaced axially along the second fluid conduit, or spaced circumferentially around the second fluid conduit.

11. The method according claim 10, wherein the reactor comprises:

i) a T-piece with two opposite ports, and a third side-port, wherein the first fluid conduit comprises a region between the opposite ports, and the second fluid conduit is introduced via the side-port; or ii) a cross piece with a first pair of opposite ports and a second pair of opposite ports, the first pair being at 90 degrees to the second pair, wherein the first fluid conduit comprises a region between the first pair of ports, and the second fluid conduit is introduced through the second pair of ports.

12. The method according to claim 2, wherein the profile of the second conduit is adapted by a former attached thereto, to improve mixing downstream of the second conduit.

13. The method according to claim 12, wherein: the former tapers away from the second fluid conduit so that it is narrower in an upstream direction, or wherein the former extends the profile of the second conduit in a direction perpendicular to flow through the first conduit.

14. The method according to claim 13, wherein a heater or a cooler is provided around the outlet region and is used to control the temperature of the mixed fluid, and/or wherein a heater is provided around the second conduit and is used to provide heat to the second fluid, and/or wherein the inlet region comprises a heater or cooler and said heater or cooler is used to control the temperature of the precursor fluid.

15. The method according to claim 1, wherein the mixing reactor further comprises an inlet port in the outlet region, and the method comprises providing a quenching fluid via the inlet port in the outlet region.

16. The method according claim 1, wherein the precursor fluid comprises an aqueous solution of a metal salt.

* * * * *